(12) United States Patent
Park

(10) Patent No.: US 11,276,532 B2
(45) Date of Patent: Mar. 15, 2022

(54) ELECTRONIC COMPONENT

(71) Applicant: SAMSUNG ELECTRO-MECHANICS CO., LTD., Suwon-si (KR)

(72) Inventor: Heung Kil Park, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 203 days.

(21) Appl. No.: 16/562,795

(22) Filed: Sep. 6, 2019

(65) Prior Publication Data
US 2020/0176190 A1 Jun. 4, 2020

(30) Foreign Application Priority Data
Nov. 29, 2018 (KR) .................. 10-2018-0150772

(51) Int. Cl.
H01G 4/38 (2006.01)
H01G 4/30 (2006.01)
H01G 4/232 (2006.01)
H01G 2/06 (2006.01)
H01G 4/12 (2006.01)
H01G 4/35 (2006.01)

(52) U.S. Cl.
CPC ................ H01G 4/38 (2013.01); H01G 2/06 (2013.01); H01G 4/232 (2013.01); H01G 4/30 (2013.01); H01G 4/12 (2013.01); H01G 4/35 (2013.01)

(58) Field of Classification Search
CPC ............. H01G 4/38; H01G 4/232; H01G 2/06
See application file for complete search history.

(56) References Cited

U.S. PATENT DOCUMENTS

| 7,057,878 B2 | 6/2006 | Vierow et al. |
| 2014/0041914 A1 | 2/2014 | Hattori et al. |
| 2017/0099727 A1* | 4/2017 | Son ...................... H05K 1/0231 |

FOREIGN PATENT DOCUMENTS

| CN | 202394718 U | * | 8/2012 |
| JP | 2012-204572 A |   | 10/2012 |
| JP | 5888281 B2 |   | 2/2016 |

* cited by examiner

Primary Examiner — Eric W Thomas
(74) Attorney, Agent, or Firm — Morgan, Lewis & Bockius LLP

(57) ABSTRACT

An electronic component includes a capacitor array in which a plurality of multilayer capacitors are disposed in a row in a first direction connecting fifth and sixth surfaces, each of the plurality of multilayer capacitors including a capacitor body including a plurality of dielectric layers and a plurality of first and second internal electrodes, and first and second external electrodes respectively including first and second connection portions and first and second band portions, respectively; a first bump terminal connected to the first band portions of the plurality of first external electrodes on a first surface of the capacitor array; and a second bump terminal spaced apart from the first bump terminal and connected to the second band portions of the plurality of second external electrodes on the first surface of the capacitor array.

13 Claims, 7 Drawing Sheets

ELECTRONIC COMPONENT

CROSS-REFERENCE TO RELATED APPLICATION(S)

This application claims benefit of priority to Korean Patent Application No. 10-2018-0150772 filed on Nov. 29, 2018 in the Korean Intellectual Property Office, the disclosure of which is incorporated herein by reference in its entirety.

TECHNICAL FIELD

The present disclosure relates to an electronic component.

BACKGROUND

A multilayer electronic component such as a multilayer capacitor is formed of a dielectric material. As a dielectric material has piezoelectricity, a dielectric material may be synchronized with an applied voltage and may be deformed.

When a period of an applied voltage is within an audio frequency band, displacement of the voltage may turn into vibrations, the vibrations may be delivered to a substrate through a solder, and vibrations of the substrate may be perceived as audible sounds. The vibration sound is referred to as acoustic noise.

When a device operates in a quiet environment, a user may perceive acoustic noise as abnormal noise, and may believe that the device has malfunctioned.

Also, acoustic noise may overlap a voice output in a device having a voice circuit, and quality of the device may degrade.

Besides audible acoustic noise, when piezoelectric vibrations of a multilayer capacitor occur in a high radio frequency range of 20 kHz or higher, piezoelectric vibrations may cause malfunctions of sensors used in the IT and automotive industries.

SUMMARY

An aspect of the present disclosure is to provide an electronic component which may reduce acoustic noise and high frequency vibrations generated in a frequency of 20 kHz or higher.

According to an aspect of the present disclosure, an electronic component is provided, the electronic component comprising: a capacitor array in which a plurality of multilayer capacitors are disposed in a row in a first direction connecting fifth and sixth surfaces, each of the plurality of multilayer capacitors comprising a capacitor body including a plurality of dielectric layers and a plurality of first and second internal electrodes alternately disposed with the dielectric layers interposed therebetween, having first and second surfaces opposing each other, third and fourth surfaces connected to the first and second surfaces and opposing each other, fifth and sixth surfaces connected to the first and second surfaces and the fifth and fourth surfaces and opposing each other, and including one ends of the first and second internal electrodes exposed through the third and fourth surfaces, respectively, and first and second external electrodes respectively including first and second connection portions disposed on the third and fourth surfaces of the capacitor body, respectively, and first and second band portions extending from the first and second connection portions onto a portion of the first surface of the capacitor body; a first bump terminal connected to the first band portions of the plurality of first external electrodes on a first surface of the capacitor array; and a second bump terminal spaced apart from the first bump terminal and connected to the second band portions of the plurality of second external electrodes on the first surface of the capacitor array.

The first bump terminal may have a plurality of first cut-out portions open towards an external region of the capacitor array in a second direction connecting the third and fourth surfaces in a position corresponding to each of the first band portions, and the second bump terminal may have a plurality of second cut-out portions open towards an external region of the capacitor array in the second direction in a position corresponding to each of the second band portions.

Each of the first and second bump terminals may include an insulating material and a conductor pattern disposed on a surface of the insulating material.

The first and second bump terminals may be formed of a metal.

According to an aspect of the present disclosure, an electronic component is provided, the electronic component comprising: a capacitor array in which a plurality of multilayer capacitors are disposed in a row in a second direction connecting third and fourth surfaces, each of the plurality of multilayer capacitors comprising a capacitor body including a plurality of dielectric layers and a plurality of first and second internal electrodes alternately disposed with the dielectric layers interposed therebetween, having first and second surfaces opposing each other, third and fourth surfaces connected to the first and second surfaces and opposing each other, fifth and sixth surfaces connected to the first and second surfaces and the fifth and fourth surfaces and opposing each other, and including one ends of the first and second internal electrodes exposed through the third and fourth surfaces, respectively, and first and second external electrodes respectively including first and second connection portions disposed on the third and fourth surfaces of the capacitor body, respectively, and first and second band portions extending from the first and second connection portions onto a portion of the first surface of the capacitor body; a first bump terminal connected to the first band portion of the first external electrode of one multilayer capacitor disposed on one end taken in the second direction on a first surface of the capacitor array; a second bump terminal connected to the second band portion of the second external electrode of the other multilayer capacitor disposed on an opposite end taken in the second direction on the first surface of the capacitor array; and a third bump terminal connected to the second band portion of the one multilayer capacitor disposed on one end and the first band portion of the other multilayer capacitor disposed on an opposite end on the first surface of the capacitor array.

The first bump terminal may have a first cut-out portion open towards an external region of the capacitor array in the second direction, the second bump terminal may have a second cut-out portion open towards an external region of the capacitor array in the second direction, and the third bump terminal may have a third cut-out portion having a hole shape exposing a portion of each of the second band portion and the first band portion connected to the third bump terminal.

According to an aspect of the present disclosure, an electronic component is provided, the electronic component comprising: a capacitor array in which a plurality of multilayer capacitors are aligned in a first direction connecting fifth and sixth surfaces and in a second direction connecting third and fourth surfaces in a matrix form, each of the plurality of multilayer capacitors comprising a capacitor body including a plurality of dielectric layers and a plurality of first and second internal electrodes alternately disposed with the dielectric layers interposed therebetween, having first and second surfaces opposing each other, third and fourth surfaces connected to the first and second surfaces and opposing each other, fifth and sixth surfaces connected to the first and second surfaces and the fifth and fourth surfaces and opposing each other, and including one ends of the first and second internal electrodes exposed through the third and fourth surfaces, respectively, and first and second external electrodes respectively including first and second connection portions disposed on the third and fourth surfaces of the capacitor body, respectively, and first and second band portions extending from the first and second connection portions onto a portion of the first surface of the capacitor body; a first bump terminal connected to the first band portions of the plurality of first external electrodes of the plurality of multilayer capacitors disposed on one end taken in the second direction on a first surface of the capacitor array; a second bump terminal connected to the second band portions of the plurality of second external electrodes of the plurality of multilayer capacitors disposed on an opposite end taken in the second direction on the first surface of the capacitor array; and a third bump terminal connected to the second band portion of the one multilayer capacitor disposed on one end and the first band portion of the other multilayer capacitor disposed on an opposite end on the first surface of the capacitor array. The third bump terminal may be connected to the second band portion of each of the plurality of the second external electrodes disposed adjacently to each other in the first direction and the first band portion of each of the plurality of first external electrodes disposed adjacently to each other in the first direction.

The first bump terminal may have a plurality of first cut-out portions open towards an external region of the capacitor array in the second direction in a position corresponding to each of the first band portions connected to the first bump terminal, the second bump terminal may have a plurality of second cut-out portions open towards an external region of the capacitor array in the second direction in a position corresponding to each of the second band portions connected to the second bump terminal, and the third bump terminal may have a third cut-out portion having a hole shape exposing a portion of each of the second band portion and the first band portion connected to the third bump terminal.

The third cut-out portion of the third bump terminal may be formed in each of the second band portion and the first band portion adjacent to each other in the second direction.

Each of the first to third bump terminals may include an insulating material and a conductor pattern disposed on a surface of the insulating material.

The first to third bump terminals may be formed of a metal.

A gap may be arranged between adjacent multilayer capacitors in the capacitor array.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
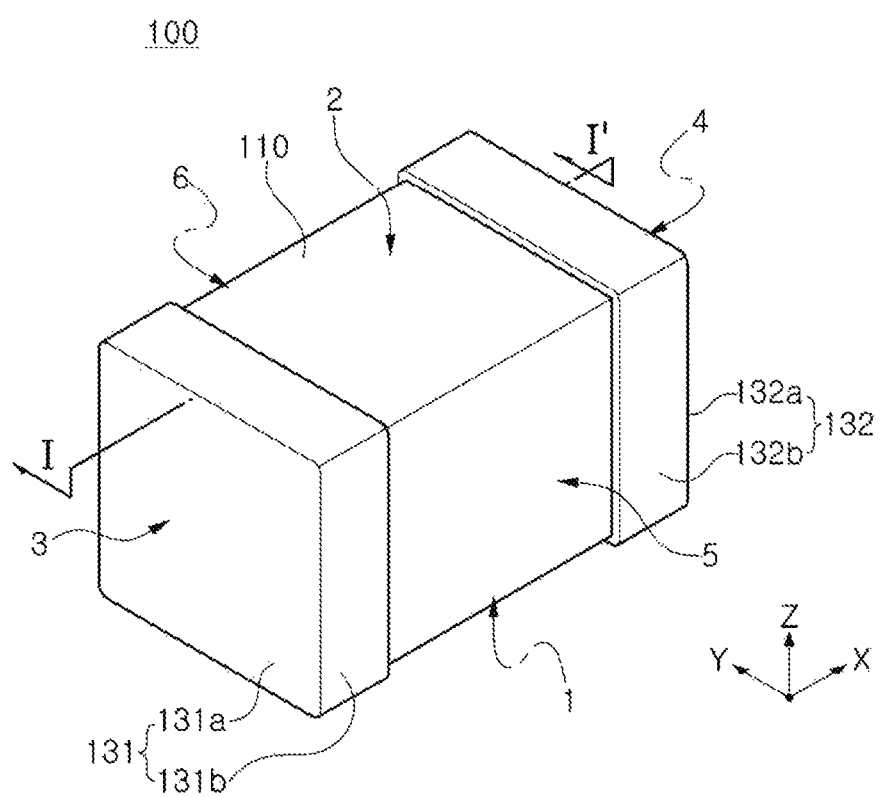
FIG. 1 is a perspective diagram illustrating a multilayer capacitor applied in an electronic component according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of elements in the drawings may be exaggerated for clarity of description, and elements indicated by the same reference numeral are same elements in the drawings.

Further, throughout the specification, it will be understood that when a portion "includes" an element, it can further include another element, not excluding another element, unless otherwise indicated.

In the drawings, an X direction, a Y direction, and a Z direction may indicate a length direction, a width direction, and a thickness direction of a capacitor body, respectively. Also, a Z direction may be the same as a layering direction in which the dielectric layers are layered.

Figure 2A:
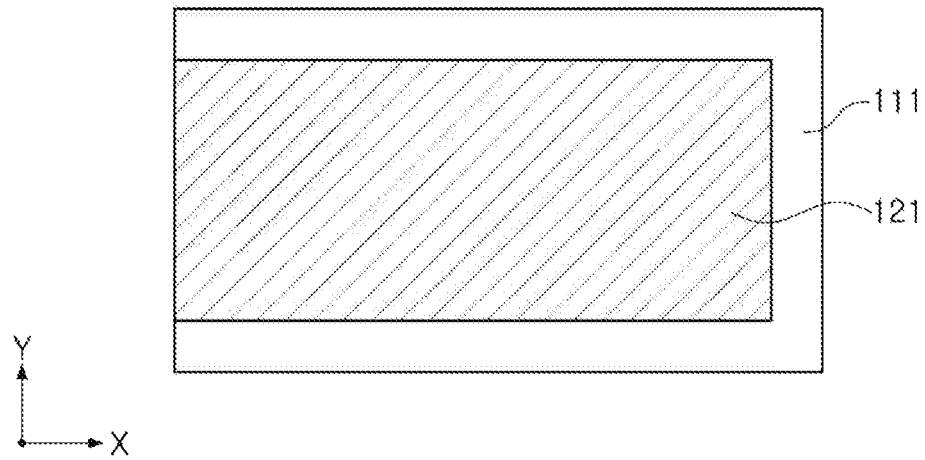
FIGS. 2A and 2B are plan diagrams illustrating first and second internal electrodes of a multilayer capacitor illustrated in FIG. 1, respectively.
Figure 2B:
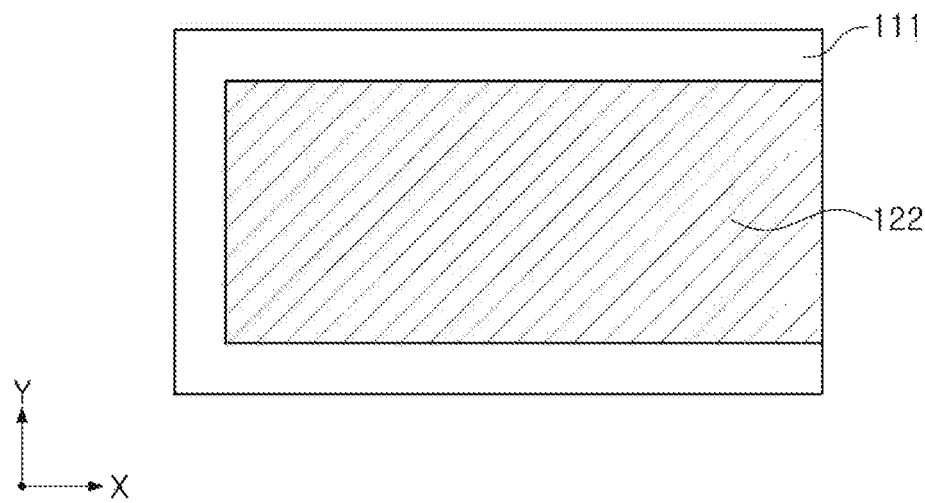
Figure 3:
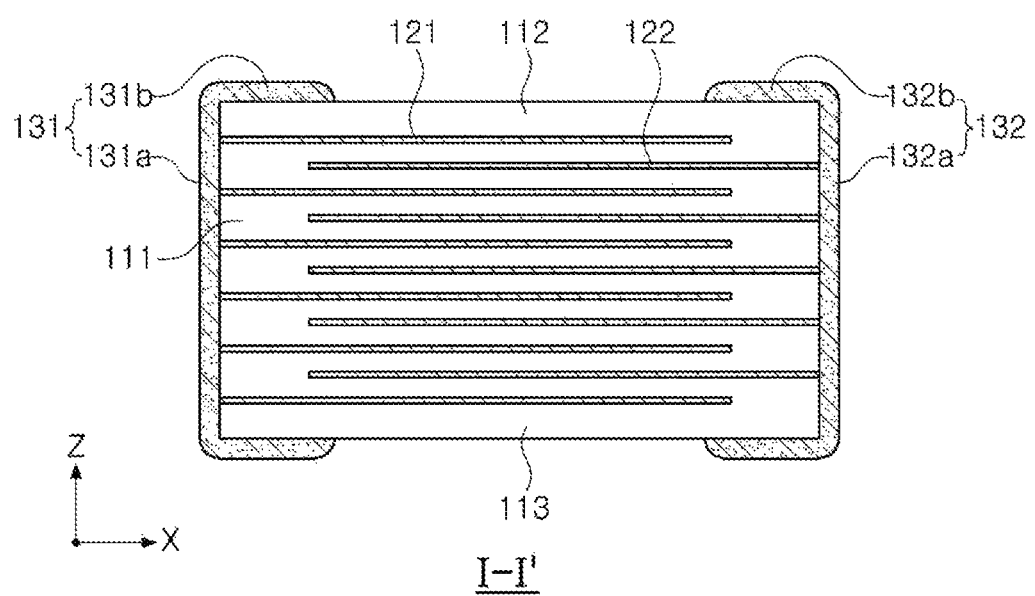
FIG. 3 is a cross-sectional diagram taken along line I-I' in FIG. 1.

FIG. 1 is a perspective diagram illustrating a multilayer capacitor applied in an electronic component according to an example embodiment. FIGS. 2A and 2B are plan diagrams illustrating first and second internal electrodes of a multilayer capacitor illustrated in FIG. 1, respectively. FIG. 3 is a cross-sectional diagram taken along line I-I' in FIG. 1.

In the description below, a structure of a multilayer capacitor applied in an electronic component will be described with reference to FIGS. 1 to 3.

Referring to FIGS. 1 to 3, a capacitor 100 in the example embodiment may include a capacitor body 110 and first and second external electrodes 131 and 132 disposed on both ends of the capacitor body 110 disposed in an X direction.

The capacitor body 110 may be formed by layering a plurality of dielectric layers 111 in a Z direction and sintering the layered dielectric layers 111. A boundary between adjacent dielectric layers 111 of the capacitor body 110 may be integrated such that it may be difficult to identify the boundary without using a scanning electron microscope (SEM).

The capacitor body 110 may include the plurality of dielectric layers 111 and first and second internal electrodes 121 and 122 having different polarities and disposed alternately in a Z direction with the dielectric layer 111 interposed therebetween.

The capacitor body 110 may include an active region contributing to forming capacitance of the capacitor, and cover regions 112 and 113 arranged in left and right portions of the active region in a Y direction and arranged in upper and lower portions of the active region in a Z direction, respectively, as margin portions.

A shape of the capacitor body 110 may not be limited to any particular shape. The capacitor body 110 may have a hexahedral shape, for example, and may have first and second surfaces 1 and 2 opposing each other in a Z direction, third and fourth surfaces 3 and 4 connected to the first and second surfaces 1 and 2 and opposing each other in an X direction, and fifth and sixth surfaces connected to the first and second surfaces 1 and 2 and to the third and fourth surfaces 3 and 4 and opposing each other.

The dielectric layer 111 may include a ceramic powder, such as a $BaTiO_3$ based ceramic powder, and the like, for example.

A $BaTiO_3$ based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially employed in $BaTiO_3$, but an example of the $BaTiO_3$ based ceramic powder may not be limited thereto.

The dielectric layer 111 may further include ceramic additives, organic solvents, plasticizers, coupling agents, dispersing agents, and the like, in addition to the ceramic powder.

The ceramic additive may include, for example, a transition metal oxide or a transition metal carbide, a rare earth element, magnesium (Mg) or aluminum (Al), and the like.

The first and second internal electrodes 121 and 122 may have different polarities, and may be disposed on the dielectric layer 111 and may be layered in the Z direction. The first and second internal electrodes 121 and 122 may be alternately disposed in the capacitor body 110 in the Z direction to oppose each other with a single dielectric layer 111 interposed therebetween.

The first and second internal electrodes 121 and 122 may be electrically insulated with each other by the dielectric layer 111 interposed therebetween.

The diagram illustrates an example in which the internal electrodes are layered in the Z direction, but an example embodiment thereof is not limited thereto. If desired, the internal electrodes may be configured to be layered in the Y direction.

One ends of the first and second internal electrodes 121 and 122 may be exposed through the third and fourth surfaces 3 and 4 of the capacitor body 110, respectively.

End portions of the first and second internal electrodes 121 and 122 alternately exposed through the third and fourth surfaces 3 and 4 of the capacitor body 110 may be electrically connected to the first and second external electrodes 131 and 132, respectively, disposed on both ends of the capacitor body 110 arranged in the X direction.

Accordingly, when a certain level of voltage is applied to the first and second external electrodes 131 and 132, an electric charge may be accumulated between the first and second internal electrodes 121 and 122.

Capacitance of the multilayer capacitor 100 may be proportional to an area of overlap between the first and second internal electrodes 121 and 122 overlapping in the Z direction in the active region.

A material of the first and second internal electrodes 121 and 122 may not be limited to any particular material. For example, the first and second internal electrodes 121 and 122 may be formed of a conductive paste including one or more of platinum (Pt), palladium (Pd), a palladium-silver (Pd—Ag) alloy, nickel (Ni), and copper (Cu).

As a method of printing the conductive paste, a screen printing method, a gravure method, or the like, may be used, but an example of the method may not be limited thereto.

The first and second external electrodes 131 and 132 may be provided with voltages having different polarities, may be disposed on both ends of the body 110 arranged in the X direction, and may be electrically connected to the exposed end portions of the first and second internal electrodes 121 and 122, respectively.

The first external electrode 131 may include a first connection portion 131a and a first band portion 131b.

The connection portion 131a may be disposed on the third surface 3 of the capacitor body 110, may be connected to the end portion of the first internal electrode 121 exposed externally through the third surface 3 of the capacitor body 110, and may electrically connect the first internal electrode 121 and the first external electrode 131.

The first band portion 131b may extend from the first connection portion 131a to portions of the first, second, fifth, and sixth surfaces 1, 2, 5, and 6 of the capacitor body 110 to improve adhesion strength, and the like.

The second external electrode 132 may include a second connection portion 132a and a second band portion 132b.

The second connection portion 132a may be disposed on the fourth surface 4 of the capacitor body 110, may be connected the end portion of the second internal electrode 122 exposed externally through the fourth surface 4 of the capacitor body 110, and may electrically connect the second internal electrode 122 and the second external electrode 132 to each other.

The second band portion 132b may extend from the second connection portion 132a to portions of the first, second, fifth, and sixth surfaces 1, 2, 5, and 6 of the capacitor body 110 to improve adhesion strength, and the like.

Each of the first and second external electrodes 131 and 132 may further include a plating layer.

The plating layer may include first and second nickel (Ni) plated layers, and first and second tin (Sn) plated layers covering the first and second nickel plated layers, respectively.

Figure 4:
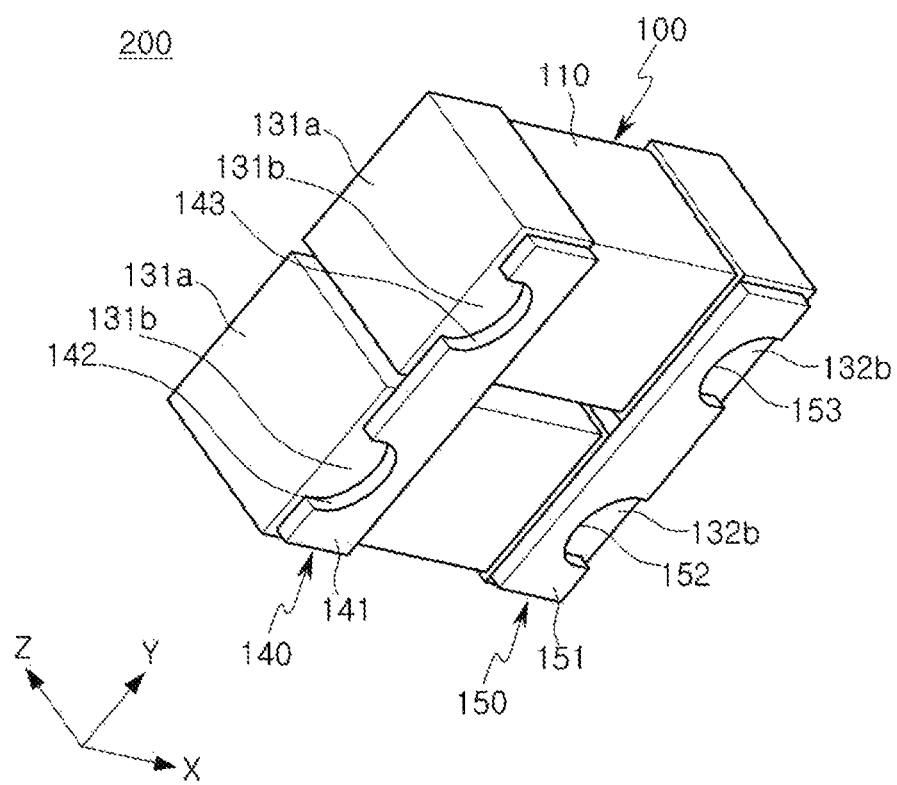
FIG. 4 is a perspective diagram illustrating an electronic component according to an example embodiment of the present disclosure.

FIG. 4 is a perspective diagram illustrating an electronic component according to an example embodiment.

Referring to FIG. 4, an electronic component 200 in the example embodiment may include a capacitor array including a plurality of multilayer capacitors 100 aligned in a Y direction and first and second bump terminals 140 and 150 disposed on a first surface of the capacitor array, amounting surface of the capacitor array.

In the capacitor array, adjacent multilayer capacitors 100 may be spaced apart from each other, and a gap may be formed between the multilayer capacitors 100.

The gap may be an air gap, such that the gap may work as a solder pocket accommodating a solder when the electronic component 200 is mounted on a substrate. Accordingly, acoustic noise may be reduced.

In the example embodiment, two multilayer capacitors 100 may be disposed in a row in the Y direction, the first bump terminal 140 may be configured to be simultaneously connected to first band portions 131b of a plurality of first external electrodes 131 on the first surface of the capacitor array, and the second bump terminal 150 may be spaced apart from the first bump terminal 140 in the X direction and may be configured to be simultaneously connected to second band portions 132b of a plurality of second external electrodes 132 on the first surface of the capacitor array.

The first and second bump terminals 140 and 150 may be formed of a conductor such as a metal, or the first and second bump terminals 140 and 150 may be formed of an insulating material, and a conductor pattern, formed of a metal, may be formed on a surface of the insulating material.

The insulating material may be FR-4, F-PCB, and the like, but an example of the insulating material may not be limited thereto.

As an example, in the example embodiment, the first bump terminal 140 may include a first body 141 including a connecting surface opposing both of the two first band portions 131b of the two first external electrodes 131, a mounting surface opposing the connecting surface in the Z direction, and a circumferential surface connecting the connecting surface and the mounting surface, on the first surface 1 of each of the plurality of the capacitor bodies 110.

The first bump terminal 140 may have a plurality of cut-out portions 142 and 143.

The plurality of cut-out portions 142 and 143 may be formed on the circumferential surface of the first body 141 in a position corresponding to each of the first band portions 131b.

The plurality of cut-out portions 142 and 143 may be configured to be open towards a third surface of the capacitor array, an external region of the capacitor array, in the X direction to effectively work as a solder pocket in which a solder is accommodated when the electronic component 200 is mounted on a substrate.

The second bump terminal 150 may be spaced apart from the first bump terminal 140 in the X direction, and may include a second body 151 including a connecting surface opposing both of two second band portions 132b of two second external electrodes 132, a mounting surface opposing the connecting surface in the Z direction, and a first circumference surface connecting the connecting surface and the mounting surface, on the first surface 1 of the capacitor body 110.

The second bump terminal 150 may include a plurality of second cut-out portions 152 and 153.

The plurality of second cut-out portions 152 and 153 may be formed on the circumferential surface of the second body 151 in a position corresponding to each of the second band portions 132b.

The plurality of second cut-out portions 152 and 153 may be configured to be open towards a fourth surface of the capacitor array, an external region of the capacitor array, in the X direction to effectively work as a solder pocket in which a solder is accommodated when the electronic component 200 is mounted on a substrate.

The first and second bump terminals 140 and 150 may allow the electronic component 200 and a substrate to be spaced apart from each other when the electronic component 200 is mounted on the substrate such that piezoelectric vibrations transmitted from each of the capacitor bodies 110 to the substrate may be reduced, and the first and second bump terminals 140 and 150 may absorb piezoelectric vibrations using elastic deformation thereof, thereby reducing acoustic noise.

Also, the first and second cut-out portions 142, 143, 152, and 153 may work as solder pockets, solder accommodating portions. When the electronic component is mounted on a substrate, the first and second cut-out portions 142, 143, 152, and 153 may prevent the formation of a solder fillet formed towards the second surface 2 of each of the capacitor bodies 110, thereby reducing acoustic noise.

Also, in the example embodiment, the first and second bump terminals 140 and 150 may be spaced apart from first and second connection portions 131a and 132a.

Accordingly, a spacing portion between the first and second connection portions 131a and 132a of the capacitor body 110 and the first and second bump terminals 140 and 150 in lower portions of the first and second band portions 131b and 132b may work as another solder pocket.

Each of the first and second bump terminals 140 and 150 may include a plating layer if desired.

The plating layer may include a nickel (Ni) plated layer formed on the first and second bump terminals 140 and 150, and a tin (Sn) plated layer formed on the nickel plated layer.

While the electronic component 200 is mounted on a substrate, when voltages having different polarities are applied to the first and second external electrodes 131 and 132 disposed in the multilayer capacitor 100, the capacitor body 110 may expand and contact in a thickness direction by an inverse piezoelectric effect of the dielectric layers 111, and both ends of the first and second external electrodes 131 and 132 may expand and contact in an opposite direction to the direction of expansion and contraction of the capacitor body, the Z direction, by a Poisson effect.

The expansions and contractions may cause vibrations. The vibrations may be transmitted to a substrate from the first and second external electrodes 131 and 132, and acoustic sounds may be irradiated from the substrate, which may be acoustic noise.

In the example embodiment, the amount of piezoelectric vibrations of the electronic component transmitted to the substrate in an audio frequency of 20 kHz or lower of the multilayer capacitor, caused by an inverse piezoelectric effect, may be effectively prevented such that acoustic noise may be reduced, and an increase of acoustic noise in accordance with the amount of solder may be reduced.

Also, by reducing high frequency vibrations of an electronic component, miss-operations of sensors used in IT or automotive industries, caused by high frequency vibrations of an electronic component generated in a frequency of 20 kHz or higher, may be prevented, and accumulation of internal fatigue caused by vibrations of sensors generated for a long period of time may be prevented.

Also, an overall structure of the electronic component having a capacitor array form may be simplified such that it may be easy to reduce a size of the electronic component, and the electronic component may be easily mounted on a circuit board.

Thus, a size of the electronic component may be reduced, and the same level of strength and electrical properties may be secured as when a general capacitor array is used.

Figure 5:
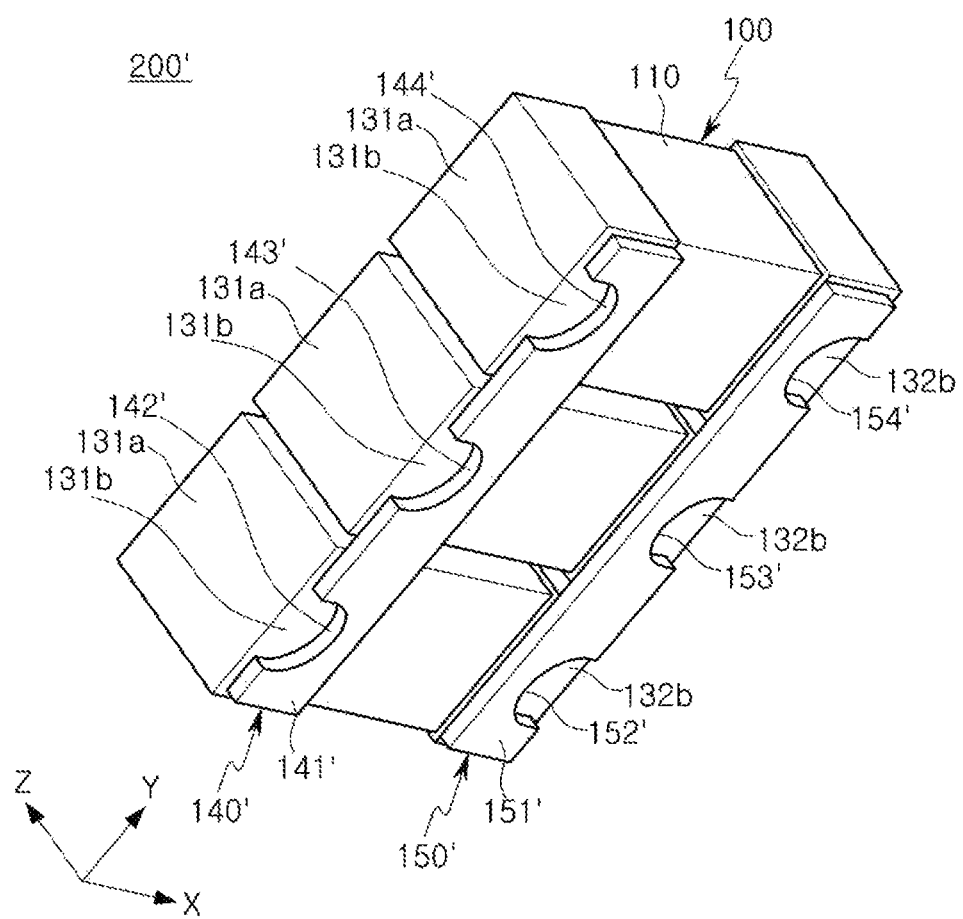
FIG. 5 is a perspective diagram illustrating a modified example of an electronic component.

FIG. 5 is a perspective diagram illustrating a modified example of an electronic component.

Referring to FIG. 5, in an electronic component 200', three multilayer capacitors 100 may be disposed in a row in the Y direction in a capacitor array.

In this case, in a first body 141' of a first bump terminal 140', three first cut-out portions 142', 143', 144' may be disposed in lower surfaces of first band portions 131b, respectively.

Also, in a second body 151' of a second bump terminal 150', three second cut-out portions 152', 153', and 154' may be disposed in lower surfaces of second band portions 132b, respectively.

Figure 6:
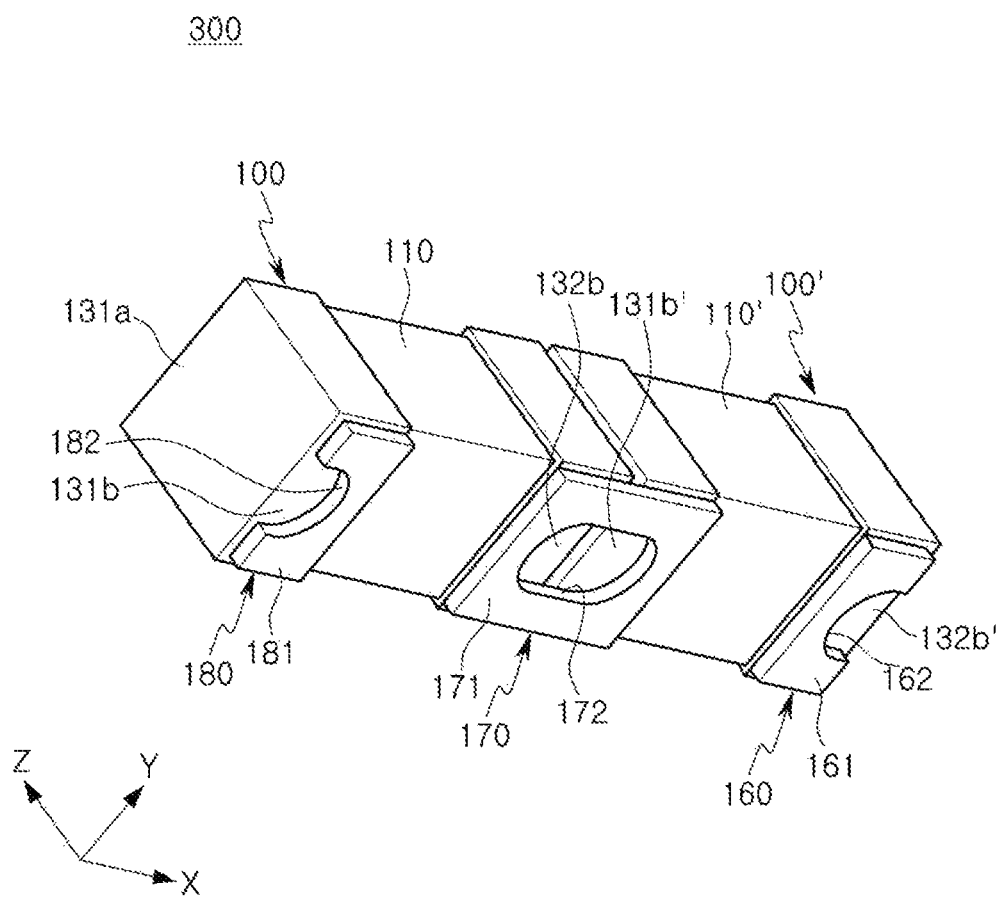
FIG. 6 is a perspective diagram illustrating an electronic component according to another example embodiment of the present disclosure.

FIG. 6 is a perspective diagram illustrating an electronic component according to another example embodiment.

Referring to FIG. 6, in an electronic component 300 in another example embodiment, two multilayer capacitors 100 and 100' may be disposed in a row in the X direction, and the electronic component 300 may include a first bump terminal 180, a second bump terminal 160, and a third bump terminal 170.

A gap may be arranged between the multilayer capacitors 100 and 100' adjacent to each other in the X direction.

The first to third bump terminals 180, 160, and 170 may be formed of an insulating material including a conductor pattern formed on a surface thereof, or may be formed of a metal.

The first bump terminal 180 may be disposed on a first surface of the capacitor array, and may be connected to a first band portion 131b of the multilayer capacitor 100 disposed on one end in the X direction.

The first bump terminal 180 may have a first cut-out portion 182 disposed on a circumferential surface of a third body 181 and open towards an external region of the capacitor array in the X direction.

The second bump terminal 160 may be disposed on the first surface of the capacitor array, and may be connected to a second band portion 132b' of the multilayer capacitor 100' disposed on an opposite end of the first bump terminal 180 in the X direction.

The second bump terminal 160 may have a second cut-out portion 162 disposed on a circumferential surface of a second body 161 and open towards an external region of the capacitor array in the X direction.

The third bump terminal 170 may be disposed on the first surface of the capacitor array, and may connect the second band portion 132b of the multilayer capacitor 100 disposed on one end and the first band portion 131b' of the multilayer capacitors 100' disposed on the other end to each other, the two multilayer capacitors 100 and 100' adjacent to each other in the X direction. The third bump terminal 170 may be simultaneously connected to the second band portion 132b and the first band portion 131b'.

The third bump terminal 170 may have a third cut-out portion 172 to simultaneously expose a portion of each of the second band portion 132b of the multilayer capacitors 100 disposed on one end and the first band portion 131b' of the multilayer capacitors 100' disposed on the other end, the second band portion 132b and the first band portion 131b' connected to a third body 171, and the third cut-out portion 172 may be configured to have a hole shape.

In the electronic component 300 configured as above, a gap between the adjacent multilayer capacitors 100 and 100' and the first to third cut-out portions 182, 162, and 172 may work as solder pockets, solder accommodating portions in which a solder is accommodated, and when the electronic component is mounted on the substrate, the formation of a solder fillet formed towards the second surface of each of capacitor bodies 110 and 110', an upper surface of each of capacitor bodies 110 and 110', may be prevented such that acoustic noise may be reduced.

Figure 7:
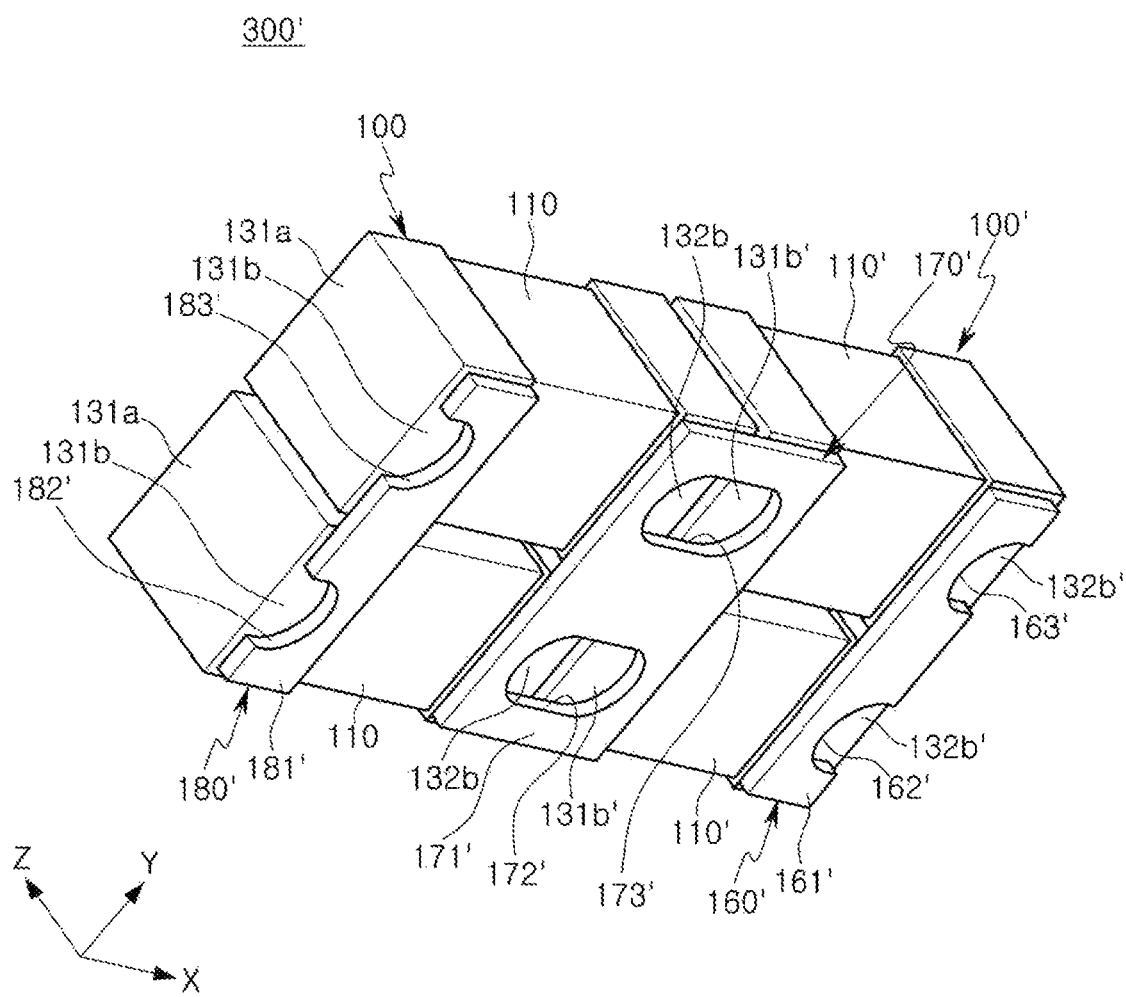
FIG. 7 is a perspective diagram illustrating an electronic component according to another example embodiment of the present disclosure.

FIG. 7 is a perspective diagram illustrating an electronic component according to another example embodiment.

Referring to FIG. 7, in an electronic component 300' in another example embodiment, a plurality of multilayer capacitors 100 and 100' may be disposed in the X direction and the Y direction in a matrix form. In the diagram, the example in which four multilayer capacitors 100 and 100' are disposed in 2*2 arrangement is illustrated, but an example embodiment thereof is not limited thereto.

In the capacitor array, a gap may be arranged between the multilayer capacitors 100 and 100' adjacent to each other in the X direction and the Y direction.

Bump terminals in the example embodiment may include a first bump terminal 180', a second bump terminal 160', and a third bump terminal 170'.

The first bump terminal 180' may be disposed on a first surface of the capacitor array, and may be simultaneously connected to first band portions 131b of a plurality of first external electrodes 131 of the plurality of multilayer capacitors 100 disposed on one end in the X direction.

The first bump terminal 180' may have a plurality of first cut-out portions 182' and 183' open towards an external region of the capacitor array in the X direction in a position corresponding to each of the first band portions 131b in a circumferential surface of a first body 181'.

The second bump terminal 160 may be disposed on the first surface of the capacitor array, and may be simultaneously connected to second band portions 132b' of a plurality of second external electrodes 132 of the plurality of multilayer capacitors 100' disposed on an opposite end in the X direction.

The second bump terminal 160' may have a plurality of second cut-out portions 162' and 163' open towards an external region of the capacitor array in the X direction in a position corresponding to each of the second band portions 132b in a circumferential surface of a second body 161'.

The third bump terminal 170' may be disposed on the first surface of the capacitor array, and may connect the second band portions 132b and the first band portions 131b' of the four multilayer capacitors 100 and 100' to each other, the multilayer capacitors 100 and 100' adjacent to each other in the X direction, and may be simultaneously connected to the second band portions 132b and the first band portions 131b'.

Also, the third bump terminal 170' may have a third cut-out portion 172' to expose a portion of the second band portions 132b of each of the multilayer capacitors 100 disposed on one end and a portion of the first band portions 131b' of each of the multilayer capacitors 100' disposed on the opposite end, the second band portions 132b and the first band portions 131b' connected to a third body 171', and each of the third cut-out portions 172' and 173' may be configured to have a hole shape.

In the third bump terminal 170', a plurality of the third cut-out portions 172' and 173' may be disposed in the second band portions 132b and the first band portions 131b', respectively, in the Y direction with a certain gap, the second band portions 132b and the first band portions 131b' adjacent to each other in the X direction.

In the electronic component 300' configured as above, a gap between the adjacent multilayer capacitors 100 and 100' and the first to third cut-out portions 182', 162', 172', and 173' may work as solder pockets, solder accommodating portions in which a solder is accommodated, and when the electronic component is mounted on a substrate, the formation of a solder fillet formed towards the second surface of each of capacitor bodies 110 and 110', an upper surface of each of capacitor bodies 110 and 110', may be prevented such that acoustic noise may be reduced.

According to the aforementioned example embodiments, when manufacturing an electronic component, a size, the number of multilayer capacitors, and the like, of an electronic component may be easily altered such that the example embodiments may be easily applied to an MLCC module with a desired size and capacitance.

Also, acoustic noise and high frequency vibrations generated in a frequency of 20 kHz or higher of an electronic component may be reduced.

While the exemplary embodiments have been shown and described above, it will be apparent to those skilled in the art that modifications and variations could be made without departing from the scope of the present invention as defined by the appended claims.

What is claimed is:

1. An electronic component, comprising:
a capacitor array in which a plurality of multilayer capacitors are disposed in a row in a first direction connecting fifth and sixth surfaces,
wherein each of the plurality of multilayer capacitors comprises:
  a capacitor body including a plurality of dielectric layers and a plurality of first and second internal electrodes alternately disposed with the dielectric layers interposed therebetween, having first and second surfaces opposing each other, third and fourth surfaces connected to the first and second surfaces and opposing each other, fifth and sixth surfaces connected to the first and second surfaces and the fifth and fourth surfaces and opposing each other, and including one ends of the first and second internal electrodes exposed through the third and fourth surfaces, respectively, and
  first and second external electrodes respectively including first and second connection portions disposed on the third and fourth surfaces of the capacitor body, respectively, and first and second band portions extending from the first and second connection portions onto a portion of the first surface of the capacitor body;
a first bump terminal connected to the first band portions of the plurality of first external electrodes on a first surface of the capacitor array; and
a second bump terminal spaced apart from the first bump terminal and connected to the second band portions of the plurality of second external electrodes on the first surface of the capacitor array,
wherein the first bump terminal has a plurality of first cut-out portions open towards an external region of the capacitor array in a second direction connecting the third and fourth surfaces in a position corresponding to each of the first band portions, and
wherein the second bump terminal has a plurality of second cut-out portions open towards an external region of the capacitor array in the second direction in a position corresponding to each of the second band portions.

2. The electronic component of claim 1, wherein each of the first and second bump terminals includes an insulating material and a conductor pattern disposed on a surface of the insulating material.

3. The electronic component of claim 1, wherein the first and second bump terminals are formed of a metal.

4. The electronic component of claim 1, wherein a gap is arranged between adjacent multilayer capacitors in the capacitor array.

5. An electronic component, comprising:
a capacitor array in which a plurality of multilayer capacitors are disposed in a row in a second direction connecting third and fourth surfaces,
wherein each of the plurality of multilayer capacitors comprises:
  a capacitor body including a plurality of dielectric layers and a plurality of first and second internal electrodes alternately disposed with the dielectric layers interposed therebetween, having first and second surfaces opposing each other, third and fourth surfaces connected to the first and second surfaces and opposing each other, fifth and sixth surfaces connected to the first and second surfaces and the fifth and fourth surfaces and opposing each other, and including one ends of the first and second internal electrodes exposed through the third and fourth surfaces, respectively, and
  first and second external electrodes respectively including first and second connection portions disposed on the third and fourth surfaces of the capacitor body, respectively, and first and second band portions extending from the first and second connection portions onto a portion of the first surface of the capacitor body;
a first bump terminal connected to the first band portion of the first external electrode of one multilayer capacitor disposed on one end taken in the second direction on a first surface of the capacitor array;
a second bump terminal connected to the second band portion of the second external electrode of the other multilayer capacitor disposed on an opposite end taken in the second direction on the first surface of the capacitor array; and
a third bump terminal connected to the second band portion of the one multilayer capacitor disposed on one end and the first band portion of the other multilayer capacitor disposed on an opposite end on the first surface of the capacitor array,
wherein the first bump terminal has a first cut-out portion open towards an external region of the capacitor array in the second direction,
wherein the second bump terminal has a second cut-out portion open towards an external region of the capacitor array in the second direction, and
wherein the third bump terminal has a third cut-out portion having a hole shape exposing a portion of each of the second band portion and the first band portion connected to the third bump terminal.

6. The electronic component of claim 5, wherein each of the first to third bump terminals includes an insulating material and a conductor pattern disposed on a surface of the insulating material.

7. The electronic component of claim 5, wherein the first to third bump terminals are formed of a metal.

8. The electronic component of claim 5, wherein a gap is arranged between adjacent multilayer capacitors in the capacitor array.

9. An electronic component, comprising:
a capacitor array in which a plurality of multilayer capacitors are aligned in a first direction connecting fifth and sixth surfaces and in a second direction connecting third and fourth surfaces in a matrix form,
wherein each of the plurality of multilayer capacitors comprises:
  a capacitor body including a plurality of dielectric layers and a plurality of first and second internal electrodes alternately disposed with the dielectric layers interposed therebetween, having first and second surfaces opposing each other, third and fourth surfaces connected to the first and second surfaces and opposing each other, fifth and sixth surfaces connected to the first and second surfaces and the fifth and fourth surfaces and opposing each other, and including one ends of the first and second internal electrodes exposed through the third and fourth surfaces, respectively, and
  first and second external electrodes respectively including first and second connection portions disposed on the third and fourth surfaces of the capacitor body, respectively, and first and second band portions extending from the first and second connection portions onto a portion of the first surface of the capacitor body;

a first bump terminal connected to the first band portions of the plurality of first external electrodes of the plurality of multilayer capacitors disposed on one end taken in the second direction on a first surface of the capacitor array;

a second bump terminal connected to the second band portions of the plurality of second external electrodes of the plurality of multilayer capacitors disposed on an opposite end taken in the second direction on the first surface of the capacitor array; and a third bump terminal connected to the second band portion of one multilayer capacitor disposed on one end and the first band portion of the other multilayer capacitor disposed on an opposite end on the first surface of the capacitor array, wherein the third bump terminal is connected to the second band portion of each of the plurality of the second external electrodes disposed adjacently to each other in the first direction and the first band portion of each of the plurality of first external electrodes disposed adjacently to each other in the first direction, wherein the first bump terminal has a plurality of first cut-out portions open towards an external region of the capacitor array in the second direction in a position corresponding to each of the first band portions connected to the first bump terminal, wherein the second bump terminal has a plurality of second cut-out portions open towards an external region of the capacitor array in the second direction in a position corresponding to each of the second band portions connected to the second bump terminal, and wherein the third bump terminal has a third cut-out having a hole shape exposing a portion of each of the second band portion and the first band portion connected to the third bump terminal.

10. The electronic component of claim 9, wherein the third cut-out portion of the third bump terminal exposes each of the second band portion and the first band portion adjacent to each other in the second direction.

11. The electronic component of claim 9, wherein each of the first to third bump terminals includes an insulating material and a conductor pattern disposed on a surface of the insulating material.

12. The electronic component of claim 9, wherein the first to third bump terminals are formed of a metal.

13. The electronic component of claim 9, wherein a gap is arranged between adjacent multilayer capacitors in the capacitor array.

* * * * *